United States Patent [19]
Bunting et al.

[11] Patent Number: 4,713,286
[45] Date of Patent: Dec. 15, 1987

[54] PRINTED CIRCUIT BOARD DRILL AND METHOD OF MANUFACTURE

[75] Inventors: John A. Bunting; Louis M. Pope, both of Provo, Utah; James L. Clark, Lubbock, Tex.

[73] Assignee: Precorp, Inc., Niles, Ill.

[21] Appl. No.: 793,202

[22] Filed: Oct. 31, 1985

[51] Int. Cl.[4] .............................. B22F 3/14; B22F 7/08
[52] U.S. Cl. ...................................... 428/323; 51/307;
  51/309; 428/698; 428/699
[58] Field of Search ............... 51/309, 307; 428/698, 428/699, 701, 323, 325

[56] References Cited
U.S. PATENT DOCUMENTS 3,136,615  6/1964  Bovenkerk et al. ............... 51/309 X
3,141,746  7/1964  De Lai ................................. 51/307
4,359,335 11/1982  Garner ............................ 428/698 X
4,403,015  9/1983  Nakai et al. ..................... 428/698 X Primary Examiner—Nancy A. B. Swisher
Attorney, Agent, or Firm—Dick and Harris

[57] ABSTRACT

A composite sintered abrasive drill blank for formation into a rotary cutting tool in which one or more veins of sintered abrasive particulate are positioned to extend longitudinally from the conically shaped point region of the drill blank. The one or more veins of abrasive particulate are directly and molecularly bonded into the drill blank structure to expose the sintered abrasive particulate at both the top conical surface and the circumferential edges of the drill blank, with the sintered abrasive particulate forming the cutting surface elements of the rotary cutting tool formed therefrom.

12 Claims, 12 Drawing Figures

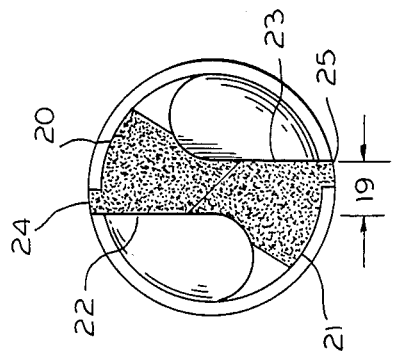
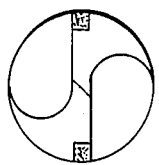
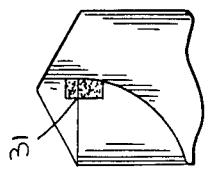
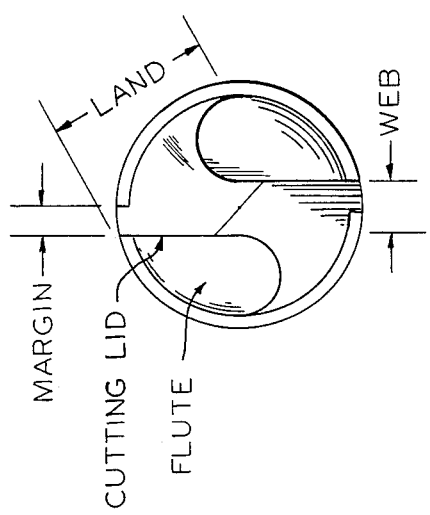
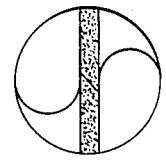
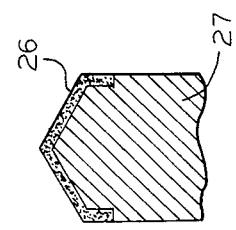
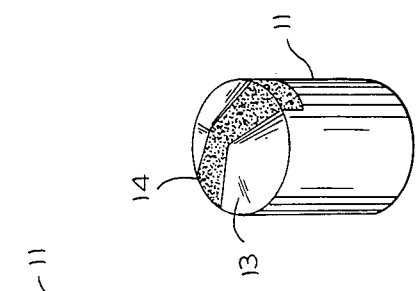
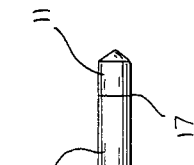
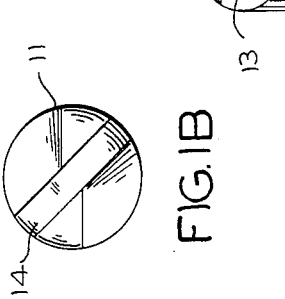
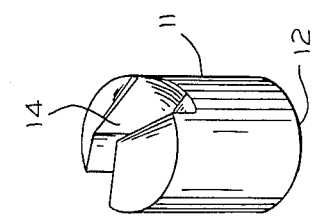
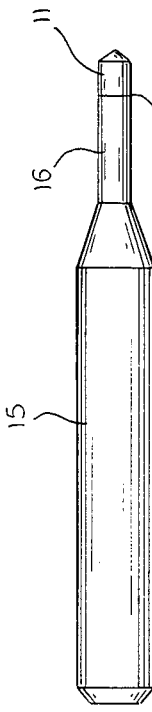

PRINTED CIRCUIT BOARD DRILL AND METHOD OF MANUFACTURE

BACKGROUND OF THE INVENTION

The present invention relates to a drilling tool and more particularly to a composite sintered abrasive twist drill for drilling holes in printed circuit boards.

In the manufacture of circuit boards patterns of electrically conductive foil are imprinted on boards made of fiberglass-reinforced plastic. Since the patterns are formed on both surfaces of a double-layer board, plus in the interior of multi-layer boards, electrical connection between conductors of adjacent patterns is accomplished through metal plating. Small holes are drilled in the board through the conductors and a conductive metal then deposited from one conductor through the hole to the other conductor or conductors. To ensure proper electrical contact with all of the conductors the metal must flow through the plate or coat the entire surface of the hole. Therefore, each hole must be regular in size, have a smooth surface, and be free from burrs and resin smear. This requires a very sharp drill and precise drilling techniques.

The printed circuit boards are usually made of copper clad glass-epoxy laminates which are extremely abrasive. Therefore, a drill which is suitable for use with such materials should be as wear resistant as possible in order to maintain a cutting edge. For efficiency in manufacture similar boards are commonly stacked and drilled simultaneously. The drills must, therefore, be of sufficient length to pass through three or more boards, and for acceptable top to bottom registration, they must be rigid. Because of the small size of the holes, i.e., 0.006 to 0.125 inches, the drills are very slender and elongated. This fact, coupled with the axial thrust loading applied to the drills, dictates that the drill material should be as tough as possible. These properties, i.e., rigidity, toughness and resistance to wear are mutually exclusive, since the most wear resistant materials tend also to be brittle, while the toughest materials tend also to wear rapidly. These differing requirements have therefore necessitated comprises in the choice of the materials heretofore used in the manufacture of such drills. While drills have been made of various materials, the composition of materials used in the body of each drill has been uniform over its entire length. As a result, the cutting surfaces have been somewhat less wear resistant and the remainder of the body somewhat more brittle than would otherwise be desireable. Tool designers have thus found great challenge in selecting tool materials with the best compromises between wear resistance and toughness. Beyond a certain point marginal improvement in wear resistance has substantially increased the risk of an unacceptable rate of tool failure from breakage; conversely, an unbreakable tool has proven to wear very rapidly.

In the drilling process rapid removal of the chips is necessary to prevent overheating of the drill which causes dulling of the cutting edges and also melting of the board material, which in turn produces resin smear in the hole. Therefore, a twist drill having helical flutes is commonly used between 750 and 1500 times in drilling multi-layer boards and then resharpened to restore the cutting edges. Because of the back taper given to the drills they can usually be resharpened only three to five times before the diameter, and corresponding, the diameter of the hole, is reduced and becomes unacceptable.

Heretofore the most wear resistant materials known, i.e., diamond and cubic boron nitride, have not been available for use in drills of the size employed with printed circuit boards. The difficulties involved in handling crystalline compacts of diamond or cubic boron nitride of the very small dimensions required for abrasive tipped printed circuit board (PCB) drills, and then the further difficulties of grinding such compacts to produce the webs, lips, and edges, have precluded the use of these materials in drills of the sizes required.

SUMMARY OF THE INVENTION

In the present invention a printed circuit board drill and method of manufacture is provided which facilitates the use of the most wear resistant materials, such as diamond or cubic boron nitride as the cutting surfaces and materials having the highest transverse rupture strength and toughness, such as high tensile strength carbides or low carbon steels, as the shank and body of the drill. This is accomplished by forming a composite sintered abrasive tip of cemented carbide and diamond or cubic boron nitride, such that the cemented carbide can be ground away to expose the abrasive as the cutting surfaces without grinding significant amount of the abrasive. A cemented carbide or steel shank with a reduced section is provided to form the shank and body of the drill. The tip is attached to the free end of the reduced section and then helical flutes are ground over the combined length of the tip and the reduced section.

DRAWINGS

The best most presently contemplated of carrying out the invention will be understood from the detailed description of the preferred embodiments illustrated in the accompanying drawing in which:

FIG. 1a is a perspective view, and 1b is an end view, of a cemented carbide blank according to the present invention:

FIG. 2 is a perspective view of a sintered composite abrasive tip;

FIG. 3 is an elevation view of a shank and body with the tip of FIG. 2 attached;

FIG. 4 is an elevation view of a helical fluted PCB drill according to the present invention;

FIG. 5 is an end view of a helical fluted twist drill with the various parts identified;

FIG. 6 is an end view of the drill of FIG. 4;

FIG. 7a is an elevation view in section and 7b an end view of another embodiment; and FIG. 8a is an elevation view in section, 8b is an end view, and 8c is an elevation view of yet another embodiment.

DESCRIPTION OF PREFERRED EMBODIMENTS

The present invention contemplates provision of an improved helical-fluted PCB drill in the range of 0.006 to 0.125 inch diameters in which the body is formed of material having high transverse rupture strength and optimum toughness, while the cutting surfaces are composite sintered abrasive having optimum wear resistance. This drill has extended effective life and is capable of producing several times the number of quality holes in multi-layer boards achieved by the best standard tungsten carbide drills. The present drill involves a composite sintered abrasive tip in which the abrasive is arranged in a predetermined shape and location at one end. As shown in FIG. 1 of the drawing, a preferred embodiment includes a generally cylindrical blank 11 made of a suitable cemented carbide, such as tungsten carbide. In the selection of material of the blank the wear resistance properties do not predominate. Instead, consideration is given to other properties, such as transverse rupture strength, toughness, ease of brazing or welding, and ease of grinding. The blank is so dimensioned as to be easy to handle, the length being approximately two or three times the diameter. One end 12 of the blank is flat to provide an attachment surface while the opposite end 13 is conical and is provided with a transverse groove 14. The groove is located on a diameter of the blank and extends across the full width thereof. The configuration of the groove is ideally that of a rectangle which is revolved about the longitudinal axis of the blank as it extends along said axis into the blank. The angle of revolution corresponds to the helix angle selected for the drill and is normally about 25° to 45°. In practice as shown in FIG. 1, the groove may resemble a rectangular prism with a wedge-shaped arcuate segment protruding from each side adjacent the opposite ends, the segments tapering oppositely toward the the adjacent end of the prism at the bottom of the groove. The width of the groove may vary from approximately ⅛ to ⅓ the diameter of the blank depending upon the design of the drill, since the groove width corresponds to the thickness of the web desired for the drill. The groove may be formed in the blank by a suitable die when the blank is formed or it may be machined into the blank after it is formed.

A mass of abrasive particles, e.g., diamond or cubic boron nitride, of 1 to 200 micron, preferable 4–8 micron, is mixed with a suitable figitive binder, such as parafin, etc., and packed so as to completely fill the groove including the conical end. The blank with the abrasive is then placed in a tubular mold of molybdenum or other refractory metal along with a disc of a suitable catalytic sintering aid, such as cobalt, iron, nickel, etc. Alternatively, the diamond is mixed with metals, metal compounds, or metal alloy powders of a suitable catalytic sintering aid. A cap of this catalytic sintering aid or refractory metal with an internal cone shaped surface is placed on the mold over the abrasive and the mold is then loaded into a high pressure, high temperature (HP/HT) press. The contents of the mold are then subjected to pressures of 45Kbar to 75 Kbar and temperatures of 1200° C. to 1600° C. for approximately 1 to 20 minutes. Apparatus and techniques for such sintering are disclosed in U.S. Pat. Nos. 2,941,248; 3,141,746; 3,745,623; and 3,743,489 (incorporated herein by reference). When the abrasive mass is fully sintered, with the particles bonded directly to each other and to the carbide by the sintering process, the blank is removed from the press. As shown in FIG. 2, the resultant composite sintered abrasive tip is made up of a cemented carbide cylinder with a vein of fully sintered abrasive particles imbedded in and extending across one end thereof.

The composite sintered abrasive tip is attached to a shank of a suitable tough material, such as steel, tungsten carbide, etc., which has high transvers rupture strength and rigidity. The shank 15, FIG. 3, is formed or machined with a reduced section 16 which makes up the body of the drill. The flat end 12 of the tip is brazed or similarly secured to the similarly flat end 17 of the reduced section. As shown in FIG. 4, helical flutes 18 are then machined or ground into the tip and the reduced section. The flutes begin at the conical end in the cemented carbide on eith side of the abrasive vein and then proceed around the tip at the helix angle. The abrasive vein forms the web 19 and the lands 20, 21 of the drill as illustrated in FIG. 6. The taper of the vein exposes protruding edges 22 and 23 which form the cutting lips of the drill. As the carbide is removed during the fluting operation portions of the abrasive vein are exposed and define sections of the flutes. The web behind the edges 22 and 23 is provided with a desired angle or rake, either by shaping the cap of the mold in which the tip is sintered or by subsequent grinding. Depending upon the design of the drill, ribs 24 and 25 may be formed during the sintering process and then exposed when the carbide is removed from the remainder of the lands 20 and 21 by grinding. The abrasive vein is extremely hard and very difficult and time consuming to grind. Accordingly, it is desireable to mold the abrasive mass and then sinter it as close as possible to the finished configuration desired for the drill.

Alternative embodiments of tip constructions are illustrated in FIGS. 7 and 8. In the embodiment of FIGS. 7a and 7b the abrasive vein is imbedded in a shallow groove which extends across the end of the tip 27 and a short distance down the opposite sides. In the embodiment of FIGS. 8a, 8b and 8c the abrasive vein may be discontinuous, being in segments 28 and 29 which are imbedded in groove sections formed in the end of the tip 30 at the opposite extremeties of a diameter thereof. The sections of the groove are formed at the corners of the tip and are deep enough that the abrasive vein is exposed along the sides of the tip as well as across at least portions of the end. The edge 31 of both sections of the groove is preferably tapered in the direction of the flute and at the helix angle, so that the leading edges of the abrasive vein segments imbedded therein will accommodate the flutes when they are ground. In the embodiments of FIGS. 7 and 8 the abrasive vein is located at the extremity of the tip and exposed at the end and along opposite sides thereof. When the flutes are ground and the tip pointed the abrasive vein forms the cutting a surfaces of the drill. In this respect, the great majority of the cutting action and resultant wear of the drill occurs at the corners where the abrasive is located. In the embodiment of FIG. 8, while the sections of the groove are illustrated as separated by a section of carbide it may be desireable in some instances to extend the sections such that the groove, and thereby the vein of abrasive, is continuous across the end of the tip. It is understood that in the embodiments of FIGS. 7 and 8, similarly to FIGS. 1 and 2, the abrasive mixture is packed in the groove; the blank and abrasive is placed in a mold and then sintered in a HP/HT press. The tip is then attached to the reduced section of a shank and the body of the drill fluted. The end of the tip is then pointed and finished to provide the finished drill.

Applicants have provided an improved construction and method of manufacture for PCB drills in the range of 0.006 to 0.125 inches in diameter which facilitates the use of materials having the optimum wear resistance, transverse rupture strength and toughness properties. While the present teachings are primarily applicable to PCB drills in the specified range, it is contemplated that the same construction and method of manufacture may, in some instances, be applicable to drills outside the range.

While the invention has been described with reference to specifically illustrated preferred embodiments, it should be realized that various changes may be made without departing from the disclosed inventive subject matter particularly pointed out and claimed herebelow:

We claim:

1. A composite sintered abrasive drill blank for formation into a rotary cutting tool comprising:
    a drill blank of a first material, having a cylindrically shaped region with a top and bottom side,
    said drill blank including a conically shaped point region of said first material, at said top side of said cylindrically shaped region;
    one or more veins of sintered abrasive particulate extending longitudinally from the top of said conically shaped point region into said cylindrically shaped region of said drill blank, from the circumferential edge of said drill blank inwardly along at least a portion of the diameter of said drill blank;
    said one or more veins of sintered abrasive particulate being directly and molecularly bonded to said first material of said drill blank without the utilization of intermediary carrier and substrate materials, so as to expose said sintered abrasive particulate only at both the top conical surface of said conically shaped point region and at the circumferential edges of said cylindrically shaped region, of said drill blank,
    said one or more veins of sintered abrasive particulate retaining their position within said drill blank upon formation of said drill blank into said rotary cutting tool at which time the longitudinal edges of said one or more veins of sintered abrasive particulate are exposed to form cutting surface elements for said rotary cutting tool.

2. The invention according to claim 1 in which said one or more veins of sintered abrasive particulate are exposed at the circumferential edges of said cylindrically shaped region of said drill blank at diametrically opposed positions along said drill blank.

3. The invention according to claim 1 in which said one or more veins of sintered abrasive particulate comprises a single vein extending across the diameter of said drill blank,
    said single vein having the geometric configuration of a rectangular prism with parallel opposite sides, and extending longitudinally from said top of said conically shaped point region into said cylindrically shaped region of said drill blank.

4. The invention according to claim 1 in which said one or more veins of sintered abrasive particulate comprises a single vein extending across the diameter of said drill blank,
    said single vein having the geometric configuration of a rectangular prism with a radially disposed hourglass shape, and extending longitudinally from said top of said conically shaped point region into said cylindrically shaped region of said drill blank.

5. The invention according to claim 1 in which said one or more veins of sintered abrasive particulate extend longitudinally from the top of said conically shaped point region into said cylindrically shaped region of said drill blank at an acute angle relative to the longitudinal axis of said drill blank.

6. The invention according to claim 1 in which said first material comprises a carbide material;
    said sintered abrasive particulate comprising a diamond material.

7. The invention according to claim 1 in which said first material comprises a carbide material;
    said sintered abrasive particulate comprising a cubic boron nitride material.

8. The invention according to claim 1 in which said one or more veins of sintered abrasive particulate comprises a single vein extending longitudinally from the top of said conically shaped point region into said cylindrically shaped region of said drill blank a first distance,
    said single vein including end regions along diametrically opposite circumferential edges of said drill blank, which end regions extend longitudinally into said cylindrically shaped region a second distance greater than said first distance.

9. The invention according to claim 1 in which said one or more veins of sintered abrasive particulate extending longitudinally from the top of said conically shaped point region into said cylindrically shaped region of said drill blank comprises two diametrically opposed separated veins extending radially inwardly from their respective circumferential edges of said drill blank.

10. The composite sintered abrasive drill blank of claim 1 in which the invention further comprises an elongated shank member of said first material,
    said rotary cutting tool comprising the combination of said composite sintered abrasive drill blank rigidly attached to said elongated shank member.

11. the invention according to claim 10 in which said shank member includes a reduced section extending from one end thereof for fixed and restrained attachment to the bottom side of said cylindrically shaped region of said drill blank.

12. The invention according to claim 1 in which said drill blank is formed into said rotary cutting tool through the processes of helical fluting, grinding and finishing of same,
    said one or more veins of sintered abrasive particulate located within said drill blank being exposed, upon said fluting, to form the surface cutting edges of the rotary cutting tool formed thereby.

* * * * *

UNITED STATES PATENT AND TRADEMARK OFFICE
CERTIFICATE OF CORRECTION

PATENT NO.   : 4,713,286
DATED        : December 15, 1987
INVENTOR(S)  : Bunting, et al.

It is certified that error appears in the above-identified patent and that said Letters Patent is hereby corrected as shown below:

Col. 1, line 43     "comprises in" should be instead --compromises in--

Col. 4, line 41     "cutting a surfaces" should be instead --cutting surfaces--

Signed and Sealed this

Twenty-third Day of August, 1988

Attest:

DONALD J. QUIGG

*Attesting Officer*     *Commissioner of Patents and Trademarks*